United States Patent [19]

Huang

[11] 4,240,210
[45] Dec. 23, 1980

[54] METHOD AND APPARATUS FOR UTILIZING SOLAR ENERGY IN A WATER AND WASTE MANAGEMENT SYSTEM

[76] Inventor: Barney K. Huang, 2008 Varnell Ave., Raleigh, N.C. 27612

[21] Appl. No.: 29,267

[22] Filed: Apr. 11, 1979

[51] Int. Cl.³ ............................................. F26B 3/28
[52] U.S. Cl. .......................................... 34/39; 34/93; 34/136; 202/136; 203/DIG. 1; 210/612
[58] Field of Search ................ 203/DIG. 1; 202/136, 202/234; 210/10, 12; 34/93, 82, 136, 129, 39

[56] References Cited

U.S. PATENT DOCUMENTS

| | | | |
|---|---|---|---|
| 2,126,029 | 8/1938 | Parker | 34/136 |
| 3,134,651 | 5/1964 | Bice | 34/82 |
| 3,712,598 | 1/1973 | Miles | 34/129 |
| 4,109,395 | 8/1978 | Huang | 34/93 |

*Primary Examiner*—Larry I. Schwartz
*Attorney, Agent, or Firm*—Mills & Coats

[57] ABSTRACT

The present invention relates to a method and apparatus for utilizing solar energy in a water and/or waste management system. At least one rotary chamber having a porous or perforated outer wall structure and an inner disposed filter is oriented within a drying structure having a transparent surface of substantial area for allowing solar radiation to be directed through the drying structure onto said rotary chamber. Water or waste material is directed into said rotary chamber, and free water drained therefrom, leaving a sludge like material within the interior of said rotary chamber. To effectuate drying, the rotary chamber is rotatively driven and solar energy in the form of heat is collected about the exterior of the rotary chamber and utilized to dry the interior sludge. At night and when available solar radiation is minimum, drying is achieved by conventional heating means. After a selected drying period, the sludge is transferred from the rotary chamber and is used as a fuel source for the conventional heating means, in forming a fertilizer or soil conditioner material, or in any other selected suitable use.

19 Claims, 5 Drawing Figures

METHOD AND APPARATUS FOR UTILIZING SOLAR ENERGY IN A WATER AND WASTE MANAGEMENT SYSTEM

The present invention relates to water and waste management systems, and more particularly to a water and waste management system for utilizing solar energy to dry resulting sludge material or other compounds for purifying water.

BACKGROUND OF INVENTION

In the traditional treatment of water and waste material, much energy is required to dry resulting sludge to a point where the sludge or other compounds such as salts can be conveniently handled or suitably used.

In addition, many water and waste treatment systems are so designed that the use of the resulting dry sludge is very limited. This is most unfortunate and undesirable because it has been found that the resulting dry sludge has numerous valuable uses, including uses such as a fuel source or as a principal material for soil conditioners or fertilizer, etc.

SUMMARY OF INVENTION

The present invention entails a method and apparatus for water and/or waste treatment that reduces conventional fuel requirements and which is particularly designed to maximize and optimize the potential uses of the resulting dried sludge.

More particularly the present invention is provided with a rotary chamber disposed within a drying structure having a transparent outer wall of substantial area. Water and/or waste material is directed into the rotary chamber and because the same includes a porous or perforated wall structure, free water contained within the sludge may directly drain from the rotary chamber. Solar radiation passing through the transparent outer wall of the drying structure is collected about the wall structure of the rotary chamber, and this solar energy in the form of heat is ultimately used to dry sludge contained within the rotary chamber by directing air about and through the same. At night or when solar radiation is minimal, a conventional furnace is utilized to heat air and to force the same through the sludge and a filter within the rotary chamber and into the greenhouse area to be condensed for pure water or can be exhausted to the outside.

After selected drying, the resulting dried sludge is conveyed to an end portion of said rotary chamber where the sludge is deposited or collected and used in a chosen manner. In this regard, the deposited or collected sludge may be used as a source of fuel for the conventional furnace, or as a base material for a fertilizer type composition or soil conditioner.

It is, therefore, an object of the present invention to provide a water and waste management system that efficiently utilizes solar energy in drying sludge and other compounds to purify the water, and thereby reduces fuel cost of conventional fuel traditionally used in such water and waste management systems.

A further object of the present invention is to provide a water and waste management system that is designed to dry sludge in such a fashion that various valuable uses of the sludge and other compounds may be made.

Still a further object of the present invention resides in the provision of a water and waste management system of the character described above that is suitable for handling and treating water and waste material of a wide range, including sludge from municipal or industrial waste water treatment, sludge from raw water supply treatment, solid waste with high moisture content, or desalting and water purification.

Another object of the present invention is to provide an efficient and effective solar energy water and waste management system that is relatively inexpensive, efficient in operation, and which is reliable and easy to maintain.

Yet another object of the present invention is to provide a solar energy water and waste management system of the character described above wherein heat resulting from collecting solar energy is transferred to sludge within a rotary chamber by a capillary type action due to a filter interposed between the outer wall structure of the rotary chamber and the sludge contained therein.

A further object of the present invention is to provide a solar energy water and waste management system of the character described above with a dynamic air circulating system that effectively utilizes the collected solar energy during daytime and conventional heat at night.

Other objects and advantages of the present invention will become apparent from a study of the following description and the accompanying drawings which are merely illustrative of the present invention.

THE SOLAR ENERGY WATER AND WASTE MANAGEMENT SYSTEM

Figure 1:
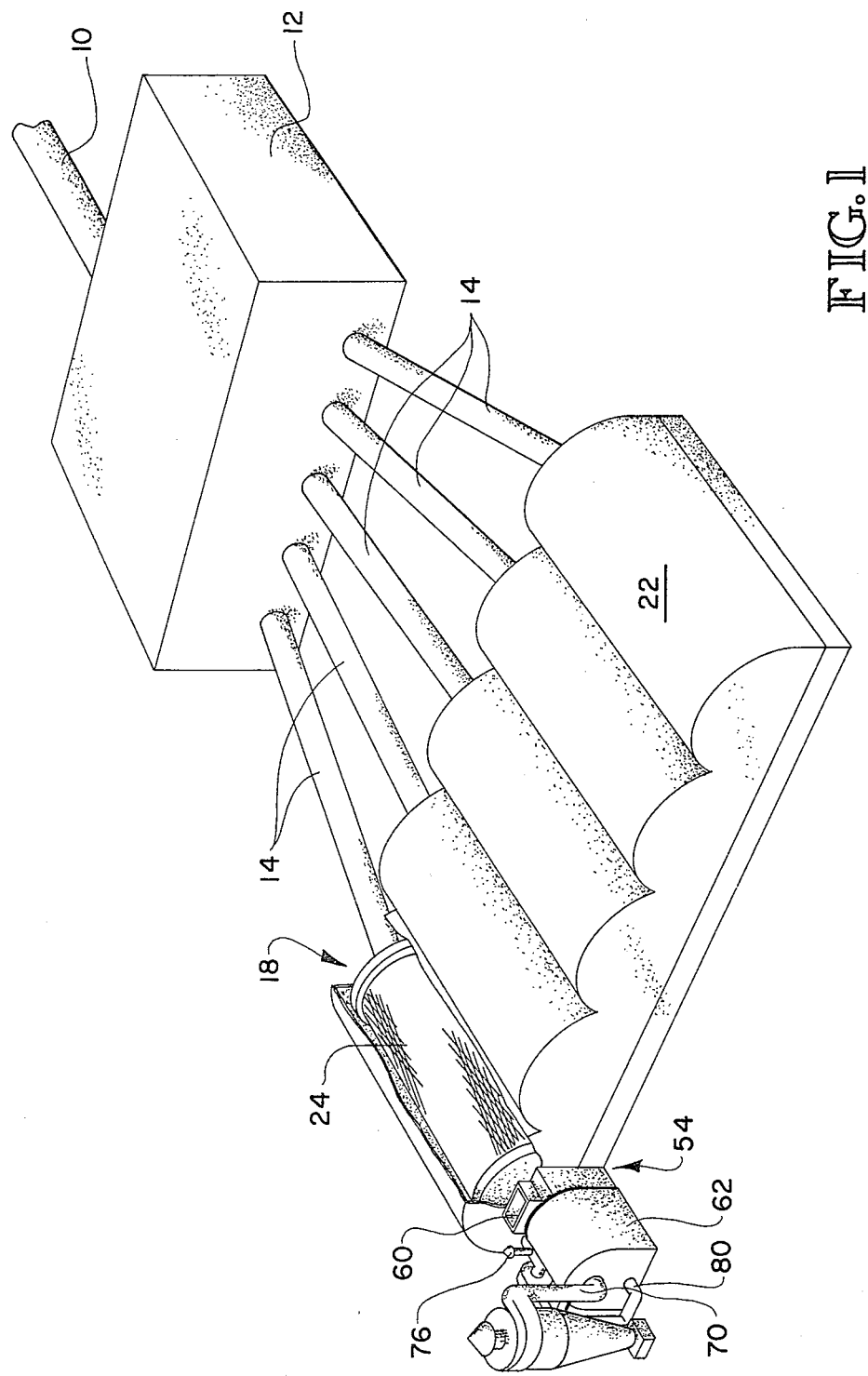
FIG. 1 is a perspective view illustrating the basic nature of the solar energy water and waste management system of the present invention.

With further reference to the drawings, particularly FIG. 1, the basic solar energy water and waste treatment system of the present invention is shown therein and entails directing the particular waste material through a primary supply pipe 10 to a primary receiving a storage tank 12. The particular waste material supplied through primary supply 10 could be any type of waste material or high salt content water including sludge from municipal or industrial waste water treatment facilities, sludge from raw water supply treatment, or even solid waste various treatments have already been applied to the water or waste material. For example, the material directed to the supply tank 12 could have already been subjected to a screen removal process for removing objects such as sticks, rags, bottles, fruit rinds or the like. In addition, it is contemplated that the same waste material would have been subjected to a grit chamber to settle out gravel, sand and the like. Finally, it is expected that the waste material could have been subjected to conventional primary sewage treatments where the various organic and inorganic matter along with suspended solids would have been dissolved in addition to the utilization of certain chemical composition such as chlorine to kill bacteria odor.

In the contemplated use of the present system, it is only after such conventional and traditional treatment, as referred to above, has been applied to the sewage, water, or waste material that the same is directed to the primary tank 12.

From the primary tank 12, the waste material, in the form of what is typically referred to as sludge, is directed through a series of distribution tubes or pipes 14 to a main drying structure, indicated by the numeral 16. As will be understood from subsequent portions of this disclosure, within the drying structure 16 there is provided at least one and in most contemplated cases a plurality of rotary chambers 18 for receiving sludge material from the primary tank 12. As will be discussed hereafter, the rotary chambers 18 are adapted to receive the sludge and to cooperate with other components of the present invention to dry the sludge material to a point where the same can be disposed of in a convenient fashion or to be used in suitable ways.

Viewing the rotary chamber 18 in more detail, it is seen that the same includes an outer cylindrical wall structure 24 that is porous in design so as to allow air and water to drain and pass therethrough. The outer wall 24 could be constructed of a ceramic porous type material or could simply be of an expanded metal design. In any case, it is contemplated that the same would be essentially thermally black for purposes of collecting solar radiation.

Continuing to refer to the rotary chamber 18, each includes a pair of end panels 26 and 28, with the front panel 26 being communicatively connected to a respective distribution pipe 14 and including a valve 30 formed about an area adjacent the front panel 26 for controlling the filling of the rotary chamber 18.

Figure 5:
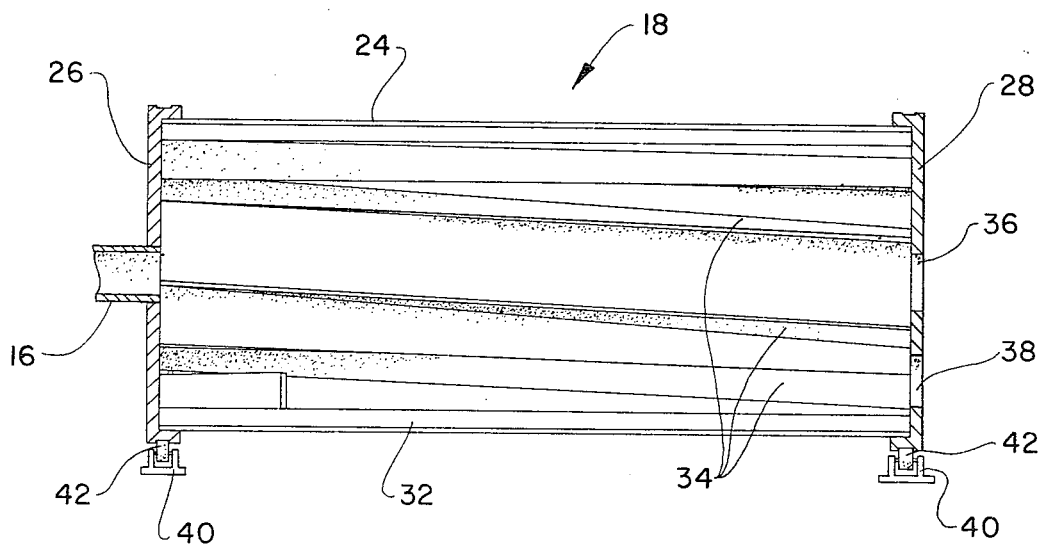
FIG. 5 is a longitudinal sectional view of the rotary chamber utilized for drying sludge.

Disposed interiorly of the outer wall 24 of the rotary chamber 18 is a filter 32. The filter 32 could be of any appropriate design, and it is understood that the outer wall 24 and filter 32 could be integrally constructed by such means as a porous type ceramic wall structure. As illustrated in FIG. 5, the interior of the rotary chamber 18 is provided with ribs 34 that project inwardly from the wall 24 thereof and which are generally spirally shaped around the inside of the wall to give rise to an auger type conveying action that will effectively convey dry material such as sludge from the front of the rotary chamber to the rear thereof, which from right to left is viewed in FIG. 3.

Formed about the rear end panel 28 is an air opening 36 and a sludge outlet opening 38. The utility of these two openings will be understood from subsequent portions of this disclosure.

Figure 3:
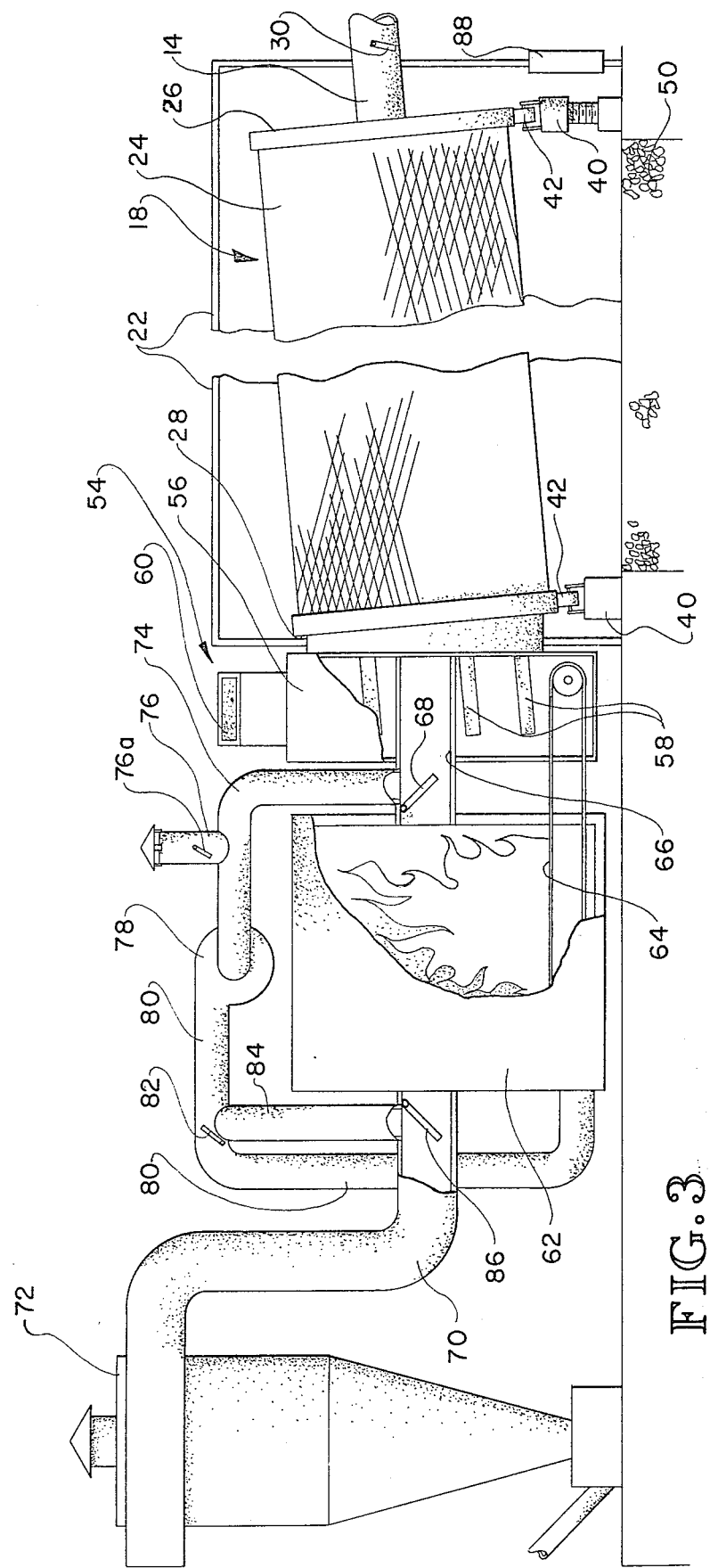
FIG. 3 is a diagrammatic side elevational view of a typical section of the solar energy water and waste management system of the present invention, particularly illustrating one rotary chamber and the associated air flow controls therefor.

Secured about the rear end of chamber 18, or the left end as viewed in FIG. 3, is a stationary rear chamber extension assembly indicated generally by the numeral 54. The rear extension assembly 54 includes an enclosed housing structure 56 that is communicatively open to the sludge outlet opening 38 formed within rear panel 28. In addition, a plurality of agitating elements 58 extend from the rear panel 28 into the housing 56 of the rear extension assembly 54. Formed about the top of the housing is an inlet hopper 60 that allows additives to be mixed with dried sludge exiting the rotary chamber 18. With respect to the agitating elements 58, it is appreciated that they could be rotatively driven by an auxiliary drive and gear assembly that would operate off the rotational movement of the rotary chamber 18. But in the embodiment illustrated, it is contemplated that the agitating elements 58 could be secured to the back panel 28 of the chamber 18 and extend rearwardly and outwardly therefrom into the enclosed housing 56 of the rear extension of the assembly 54.

Figure 2:
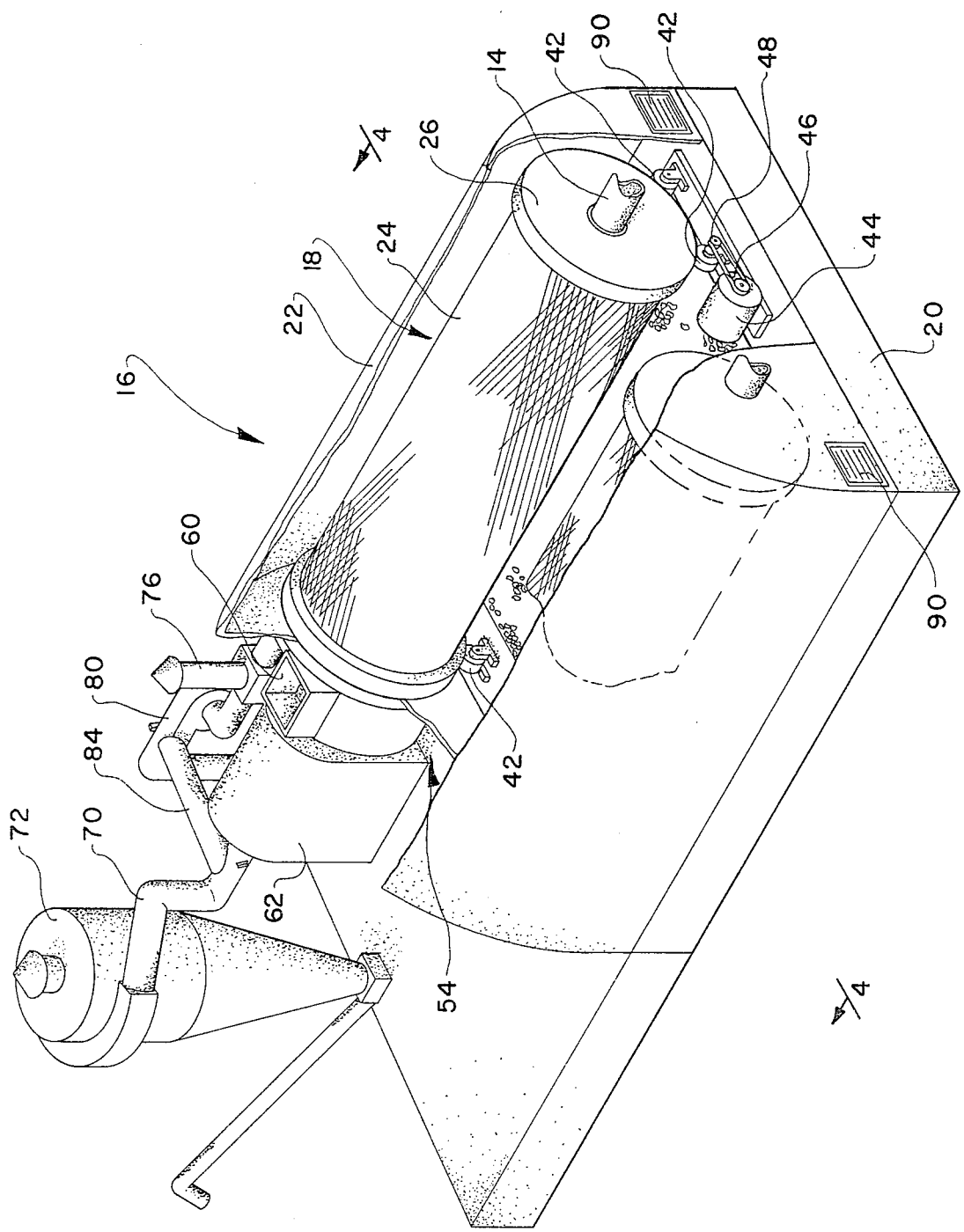
FIG. 2 is a fragmentary perspective view, in more detail, of a two cylinder embodiment of the present invention.
Figure 4:
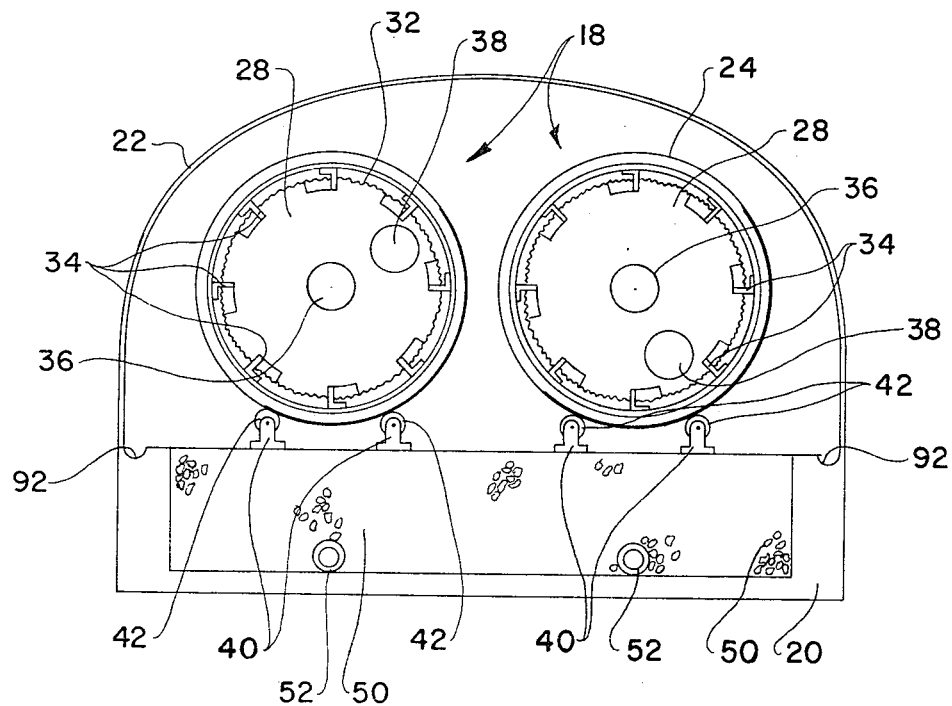
FIG. 4 is a sectional view taken along the lines 4—4 in FIG. 2.

For supporting the rotary chamber 18 within the drying structure 16 in one contemplated design, there is provided for each rotary chamber cooperating pairs of supporting blocks 40 at various longitudinal lengths, with each supporting block 40 having a roller 42 rotatively mounted therein for engaging and supporting the rotary chamber 18, as illustrated in FIGS. 2, 3 and 4. To rotatively drive each rotary chamber 18, an electric motor 44 is drivingly connected to a sheave or sprocket 48 through a flexible drive member such as a V-belt or chain 46. Sheave or sprocket 48 is adapted to drive a respective roller 42 which results in the respective rotary chambers 18 being rotated.

As illustrated in FIG. 3, the support blocks 40 could be elevated about the front end by screw type jacks or the like in order to incline the rotary chamber 18 downwardly from front to rear.

Disposed underneath each of the respective rotary chambers 18 within the drying structure 16 is a gravel type filter bed 50 that includes drain pipe means 52. As will be understood from subsequent portions of the disclosure, free water from sludge may drain from the respective chambers 18 and pass through the gravel filter bed 50 for further purification and cleaning.

Disposed rearwardly of the rear stationary extension assembly 54 is a furnace 62. As will be appreciated in subsequent portions of this disclosure, the furnace 62 is particularly provided to heat air for drying at night and when solar radiation is minimal. In the case of the disclosed embodiment, it is contemplated that dried sludge exiting from the rotary chamber 18 can be utilized as a fuel source by the furnace 62. In this regard, it is seen that a conveyor of suitable design is operatively interconnected between furnace 62 and rear extension assembly 54. More particularly, the conveyor 64 extends from the interior lower portion of the rear extension assembly 54 into the furnace such that sludge can be directly conveyed into the furnace for use as a fuel source.

It will be further appreciated that the design of the solar energy water and waste treatment system of the present invention is such that the rear extension assembly could be modified to collect dried sludge and to add certain additives for producing a fertilizer type or soil conditioner type material. In such case, the additives would be added through hopper 60 and combined with the exiting dried sludge within the enclosed housing 56. By appropriate means, the final formed product could be bagged or collected in conventional fashion.

As shown in FIGS. 2 and 3, operatively associated about the rear portion of each rotary chamber 18 and generally exterior of the main drying housing 16 is an air direction and control system. Viewing FIG. 3 and the structure involved, it is seen that the same includes a duct 66 communicatively connected to the air passageway opening 36 formed in the rear panel 28. Air duct 66 is further communicatively connected with the combustion chamber of furnace 62 and includes a valve 68. Connected to duct 66 and extending generally upwardly therefrom is a duct 74 that includes a smoke stack or air inlet 76 with valve 76a and is communicatively connected to a centrifugal fan 78. Centrifugal fan 78 is adapted to direct air through duct 80 which is connected to the lower portion of furnace 62 and communicatively connected to the combustion chamber therein. A valve 82 is operatively interconnected within duct 80. Connected to duct 80 is another duct 84 that leads to another main duct 70 that is communicatively connected with the combustion chamber of the furnace 62 and includes a valve baffle 86 therein. Duct 70 leads from the combustion chamber of the furnace 62 to a conventional cyclone cleaner 72 for cleaning and separating certain dust particles and the like from air directed thereto.

Also provided as a part of the total system is fan means 88 operatively associated with the main drying structure 16 to pressurize the same, with the fan means as shown in FIG. 2 being disposed adjacent two louvered panels within the front of the drying structure 16.

In operation the basic method of the present invention is performed or carried out as follows. Sludge or other types of waste material is directed through the primary supply pipe 10 and to primary storage tank 12, and from there the sludge or waste material is distributed to one or more rotary cylinders 18 (with openings 36 and 38 closed) enclosed within a drying structure 16. Sludge or other waste material is directed through the respective distribution pipe 14 through a valve 30 and into the rotary chamber 18. In certain instances, it may be preferable to direct the sludge into the chamber 18 under pressure and to fill the chamber completely to accelerate drainage of free water. After filling the chamber 18 with sludge or some form of waste material, because of the porous nature of the outer wall structure 24, free water can drain through the wall structure 24 thereof. This drained free water then falls and passes through the gravel type filter bed 50, further cleaning and purifying the water, and it is then directed to a collection point or other area through drain pipes 52 contained within the gravel type filter bed. It is contemplated that during this drainage that the chamber 18 may remain stationary and that the drainage will result in significant moisture loss from the sludge. In certain cases, it is contemplated that the stationary drying period could last from ten to twenty-four hours, and in certain cases shorter and longer periods may be appropriate. Once the drain phase of the process has been completed, each of the rotary cylinders 18 are rotated periodically or continuously, and in the case of the embodiment disclosed herein, this rotation is accomplished by the driving output of the electric motor 44. The surface area of the rotary chamber 18 is generally thermally black and cooperated with the transparent wall structure 22 of the drying structure to form a solar collector wherein solar radiation transmitted through the transparent walls 22 is collected in the form of heat by the exterior wall structure 24 of the rotary chamber 18. This collected solar energy in the form of heat is transferred to the filter 32 and then transferred therefrom to the sludge material contained within the chamber 18. During daytime operation and when there is sufficient available solar radiation, the fan means 88 associated with the drying structure 16 is operative to induce outside air through the louvered openings 90 and to pressurize the interior of the drying structure 16. This pressurization results in outside air being forced through the porous exterior wall structure 24 of each chamber 18, the air being forced therein and directed in contact with the sludge material in the inside of the chamber 18 and out the air passage opening 36 formed in the end panel 28 of the rotary chamber 18. This air being directed out air passageway 36 is then directed into conduit 66 and because the valve 68 is in the vertical position, the air is directed into conduit 74 and with the aid of suction created by fan 78 is induced through duct 80 into duct 84 due to the closing of valves 76a and 82, and from there into duct 70 as valve 86 is closed in the vertical position and on to the cyclone type cleaner 72. Thus, during daytime operation this is the basic system of air circulation and this is continuously maintained throughout the drying period as the rotary chamber 18 is driven.

At night or when solar radiation is minimal, heated air is furnished by the furnace 62. In this phase of the basic process or method, during the initial start-up of the furnace to clear the smoke and other debris from the furnace, air is induced by fan 78 through the inlet or smoke stack 76 and directly through conduit 80 into the combustion chamber or furnace 62. From the combustion chamber 62, this air is directed out the duct 70 to the cyclone separator 72. Once the smoke has been cleared from the furnace 62 and the area is otherwise cleaned, valve 68 will be set in the horizontal position and the air being induced from the smoke stack or inlet 76 is directed through the duct 80 into the combustion chamber of the furnace 62 and out through duct 66 into the interior of the chamber 18 where the air is dispersed out the porous wall 24 of the chamber, and eventually exhausted out the louvered openings 90 formed about the front of the drying structure. In this phase of the basic method, filter 32 disposed within the interior of the chamber could function to clean air being exhausted from the drying structure 16. In the event that further air pollution control was desired, the exhausted air could be routed back to the cyclone cleaner 72.

During this basic nighttime operation, the air escaping from the exterior wall structure 24 is directed against the cooler transparent surface 22, resulting in a condensation dehydration effect. The resulting purified water then moves down the wall structure of the drying structure 16 and is received within drainage troughs 92 formed along the lower side wall portions of the drying structure 16 to be stored or discharged.

In discussing the various air flow patterns above, it is appreciated that the various valves shown in FIG. 3 could be positioned by automatic control or other suitable means, to accommodate the air flow pattern recited. It is further appreciated that various types of air flow directional control systems could be utilized to serve the purposes required.

For greater efficiency, with a plurality of chambers 18, as suggested by FIG. 1, the basic process could be carried out in a sequential or time staggered relationship. In such a case the phases of drying for each chamber would be staggered in order that excess collected solar energy and/or furnace heat from one chamber could be routed to another chamber that could at that time utilize the energy.

In another contemplated use of the basic apparatus disclosed herein, the same rotary chambers 18 could be utilized to purify and clean salt water. In this regard, the salt water, sludge, or other type of waste or undesirable material would be directed into the chambers 18 and certain amounts of salt water would drain from the porous type exterior wall structure 24. Here again because of the filter presence, certain sludge and other waste material would be retained within the interior of the chamber 18. As the salt water would move through the exterior wall 24, a salt accumulation would build up about the exterior of the wall 24 and the condensation dehydration effect would be realized resulting from the temperature differential between the interior of the chamber 18 and the cooler surface of the transparent wall 22. In such a process, the accumulated salt on the exterior wall 24 could be scrapped and removed therefrom by some sort of blade or scrapper means that would engage the salt accumulation while the chamber was rotated.

The terms "upper", "lower", "forward", "rearward", etc., have been used herein merely for the convenience of the foregoing specification and in the appended Claims to describe the apparatus of this invention and its parts as oriented in the drawings. It is to be understood, however, that these terms are in no way limiting to the invention since the apparatus of this invention may obviously be disposed in many different positions when in actual use.

The present invention, of course, may be carried out in other specific ways than those herein set forth without departing from the spirit and essential characteristics of the invention. The present embodiments are, therefore, to be considered in all respects as illustrative and not restrictive and all changes coming within the meaning and equivalency range of the appended Claims are intended to be embraced therein.

What is claimed is:

1. A method of utilizing solar energy for drying waste material comprising the steps of: transferring the particular material, such as water or waste material, to a rotary chamber; enclosing the rotary chamber within a drying structure having a transparent wall of substantial area for allowing solar radiation to pass therethrough; draining water from the material within said rotary chamber to leave a sludge like material therein; rotating said rotary chamber and collecting solar energy about the wall structure thereof and transferring the collected solar energy inwardly to dry the sludge material; and conveying the dried sludge material from the rotary chamber where the dried sludge material may be collected and suitably utilized.

2. The method of utilizing solar energy for drying waste material, as recited in claim 1, further including the steps of generating a system of air outside of said rotary chamber and forcing the air through the exterior wall structure of said rotary chamber, through the interior of said rotary chamber and out an outlet formed therein, and continuously circulating air through the rotary chamber as described herein for continuously drying the sludge material contained therein.

3. The method of utilizing solar energy for drying waste material, as recited in claim 2, wherein at night and during times where available solar radiation is minimum, drying is effectuated by generating heat by conventional means and heating air therewith, and directing the heated air in an air inlet formed within said rotary chamber and dispersing the heated air throughout the interior thereof and out the wall structure thereof while drying sludge material contained within said rotary chamber, and wherein a condensation dehydration effect is realized as the exhausted air from the rotary chamber engages the transparent area of the drying structure due to the temperature differential between the interior of said rotary chamber and the surface of said transparent area of said drying structure.

4. The method of utilizing solar energy for drying waste material, as recited in claim 3, wherein the step of conveying the dried sludge from said rotary chamber includes engaging the sludge material within the interior of said rotary chamber with an auger type action and urging the sludge material towards one end of said rotary chamber.

5. The method of utilizing solar energy for drying waste material, as recited in claim 4, further including the step of directing the water drained from said rotary chamber through a gravel type filter bed for further purification.

6. The method of utilizing solar energy for drying waste material, as recited in claim 5, further including a step of transferring dried sludge from said rotary chamber to heating means used to conventionally generate heat and actually utilizing the transferred dried sludge as fuel for said conventional heating means.

7. The method of utilizing solar energy for drying waste material, as recited in claim 3, further including the step of filtering air leaving the exterior wall structure of said rotary drier for cleaning the air prior to being exhausted from said drying structure, and further including the step of transferring collected solar energy in the form of heat from the wall structure of said rotary chamber to an inner filter and then transferring the collected heat from the inner filter to the sludge material within said rotary chamber to effectuate drying.

8. The method of utilizing solar energy for drying waste material, as recited in claim 7, further including the step of adding fertilizer type additives to sludge being discharged from said rotary chamber to form a fertilizer type material.

9. The method of utilizing solar energy for drying waste material, as recited in claim 1, including the step of maintaining said chamber stationary for a selected period of time for draining free water from the sludge prior to the chamber being rotated.

10. The method of utilizing solar energy for drying waste material, as recited in claim 1, further including the step of adding digestive type additives and applying centrifugal force to accelerate dehydration.

11. The method of utilizing solar energy for drying waste material, as recited in claim 1, further including the step of sequentially coordinating a plurality of chambers to effectively utilize and recover heat from the various chambers and to route the recovered heat to other chambers for use in drying.

12. The method of utilizing solar energy for drying waste material, as recited in claim 1, wherein the method is utilized to purify salt water and includes the step of accumulating salt about the exterior of said chamber and scrapping the salt therefrom as said chamber is rotated.

13. A solar energy waste management system wherein solar energy is utilized to dry resulting sludge material, comprising: a rotary chamber having a radiant heat absorbing porous outer wall structure and filter means generally disposed about the interior of said wall structure; inlet means associated with said rotary chamber for allowing material such as waste material to be directed into said rotary chamber wherein free water may drain from said porous wall structure of said rotary chamber to leave sludge within the interior of said rotary chamber; drive means for rotatively driving said rotary chamber; a main drying structure enclosing said rotary chamber and having a transparent outer wall of substantial area for allowing solar radiation to be directed therethrough onto said rotary chamber wherein said drying structure and said rotary chamber cooperate to form an effective solar collector, wherein solar energy in the form of heat can be collected about the exterior of said rotary chamber and utilized to dry the sludge material therein; and conveying means associated with said rotary chamber for conveying sludge from said rotary chamber after a selected period of time.

14. The solar energy waste management system of claim 13 wherein said rotary chamber includes outlet means for allowing air to pass from the interior of said rotary chamber, and wherein said system further includes means for generating a system of air outside of said rotary chamber and directing the air through the porous exterior wall structure of said rotary chamber, into and through the interior thereof and out said outlet means, thereby drying the sludge material located in the interior of said rotary chamber during the process.

15. The solar energy waste management system of claim 14 further including conventional air heating means for heating air at night and when solar radiation is minimum, and means for directing the conventionally heated air into the interior of said rotary chamber and dispersing the same heated air therethroughout and out the porous wall structure thereof, wherein the exhausted air is directed against the transparent surface of said drying structure giving rise to a condensation dehydration effect due to the temperature differential between the transparent surface and the interior of said rotary chamber.

16. The solar energy waste management system of claim 15 wherein said rotary chamber is of a generally cylindrical shape and wherein said conveying means includes rib means extending inwardly from said wall structure of said rotary chamber and which are generally spiraled about the interior of said rotary chamber so as to give rise to an auger type conveying action as said rotary chamber is rotated.

17. The solar energy waste management system of claim 16 further including second mixing and conveying means operatively interconnected between said rotary chamber and said conventional heating and packing means for mixing dried sludge with proper additives conveying properly mixed sludge from said rotary chamber to said conventional heating means where the conditioned sludge is utilized as a fuel source; and means for adding and mixing additives to the dried sludge.

18. The solar energy waste management system of claim 17 wherein said drying structure further includes a gravel bed disposed generally below said rotary chamber for filtering and purifying water drained from said rotary chamber during the drying process.

19. The solar energy waste management system of claim 18 wherein said drying structure includes a chamber support assembly including roller means for engaging and supporting said rotary chamber within said drying structure; and wherein said drive means includes a power source drivingly interconnected to said roller means for driving the same and consequently causing said rotary chamber to be rotatively driven thereabout.

* * * * *